(12) United States Patent
King et al.

(10) Patent No.: US 9,114,794 B2
(45) Date of Patent: Aug. 25, 2015

(54) METHOD AND SYSTEM FOR CONTROLLING AN ELECTRIC VEHICLE WHILE CHARGING

(71) Applicant: Ford Global Technologies, LLC, Dearborn, MI (US)

(72) Inventors: Kimberley King, Northville, MI (US); Neil Robert Burrows, White Lake Township, MI (US); James Lawrence Swoish, Northville, MI (US); Jeffery R. Grimes, Canton, MI (US); John Paul Gibeau, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 275 days.

(21) Appl. No.: 13/799,273

(22) Filed: Mar. 13, 2013

(65) Prior Publication Data

US 2014/0277869 A1     Sep. 18, 2014

(51) Int. Cl.
| | |
|---|---|
| *B60L 9/00* | (2006.01) |
| *B60W 10/00* | (2006.01) |
| *B60W 10/26* | (2006.01) |
| *B60W 10/30* | (2006.01) |
| *B60L 1/00* | (2006.01) |
| *B60H 1/00* | (2006.01) |
| *H01M 10/44* | (2006.01) |
| *H01M 10/48* | (2006.01) |

(52) U.S. Cl.
CPC ........... *B60W 10/00* (2013.01); *B60H 1/00278* (2013.01); *B60H 1/00392* (2013.01); *B60L 1/00* (2013.01); *B60W 10/26* (2013.01); *B60W 10/30* (2013.01); *H01M 10/443* (2013.01); *B60H 2001/00307* (2013.01); *H01M 10/486* (2013.01); *H01M 2220/20* (2013.01); *Y02T 10/7005* (2013.01)

(58) Field of Classification Search
USPC ................................................. 701/22, 36, 99
See application file for complete search history.

(56) References Cited

U.S. PATENT DOCUMENTS

| | | | |
|---|---|---|---|
| 7,622,897 B2 | 11/2009 | Eberhard et al. | |
| 7,755,329 B2 | 7/2010 | Kohn et al. | |
| 7,911,184 B2 | 3/2011 | Kohn | |
| 8,054,038 B2 | 11/2011 | Kelty et al. | |
| 2011/0153140 A1 | 6/2011 | Datta et al. | |
| 2011/0191220 A1* | 8/2011 | Kidston et al. | 705/34 |
| 2012/0041622 A1* | 2/2012 | Hermann et al. | 701/22 |
| 2013/0074525 A1* | 3/2013 | Johnston et al. | 62/56 |

* cited by examiner

*Primary Examiner* — Kim T Nguyen
(74) *Attorney, Agent, or Firm* — David B. Kelley; Brooks Kushman P.C.

(57) ABSTRACT

An electric vehicle has a thermal circuit connected to a traction battery and a cabin climate system, a user interface, and a controller. The controller is configured to charge the traction battery to a target state of charge, condition the traction battery to a target battery temperature, and condition a vehicle cabin to a target cabin temperature based on a charging profile based on the user input in response to receiving a user input requesting vehicle conditioning from the user interface and the traction battery being connected to an external power source. A method for controlling an electric vehicle while connected to an external power source includes charging a traction battery to a target state of charge and conditioning the battery to a target temperature according to a charging profile based on a user initiated request for vehicle conditioning.

20 Claims, 3 Drawing Sheets

METHOD AND SYSTEM FOR CONTROLLING AN ELECTRIC VEHICLE WHILE CHARGING

TECHNICAL FIELD

Various embodiments relate to a method and a system for controlling an electric vehicle while connected to an external power source.

BACKGROUND

Vehicles such as battery electric vehicles (BEV) contain a traction battery, such as a high voltage battery, to act as an energy source for the vehicle. The battery performance, including capacity and cycle life can change depending on the operating temperature of the battery. When a BEV is taken off-plug, energy from the battery may be used to regulate the battery temperature and to operate the heating, ventilation, and air conditioning (HVAC) system when the vehicle is operating and not connected to a charger and power source. This energy use reduces the range of the vehicle as part of the battery energy is used for purposes other than propulsive energy.

SUMMARY

In an embodiment, an electric vehicle is provided with a traction battery having a battery temperature sensor, a cabin climate control system having a cabin temperature sensor, a thermal circuit connected to the traction battery and the cabin climate system, a user interface, and a controller. The thermal circuit has a thermal source and a thermal sink. The controller is connected to the traction battery, the battery and cabin temperature sensors, the thermal circuit, and the user interface. The controller is configured to, in response to receiving a user input requesting vehicle conditioning from the user interface and the traction battery being connected to an external power source, (i) charge the traction battery to a target state of charge provided by a charging profile based on the user input, (ii) condition the traction battery to a target battery temperature provided by the charging profile, and (iii) condition a cabin in the vehicle to a target cabin temperature provided by the charging profile.

In another embodiment, a method is provided for controlling an electric vehicle while connected to an external power source. A traction battery is charged to a target state of charge and the battery is conditioned to a target battery temperature according to a charging profile based on a user initiated request for vehicle conditioning.

In yet another embodiment, a method of controlling a vehicle having a traction battery is provided. The method detects if the traction battery is connected to a charger and external power source. A user initiated request for vehicle conditioning is received while the traction battery is connected to the charger and external power source. The traction battery is charged to a target state of charge while the traction battery is connected to the charger and external power source. A temperature of the traction battery is conditioned to a target battery temperature while the traction battery is connected to the charger and power source and ambient temperature is outside an environmental temperature range. A cabin in the vehicle is conditioned to a target cabin temperature while the vehicle is connected to the charger and power source. The target battery state of charge, the target battery temperature, and the target cabin temperature are determined from a charging profile based on the user initiated request.

Various embodiments have associated, non-limiting advantages. For example, while the vehicle is connected to an external power source, or charger, the user may have input on how the electric vehicle is charged and/or conditioned for use, which includes both battery conditioning and cabin conditioning. Various user inputs may include a departure time, trip information, desired cabin temperature, driving styles, user selected cost to charge, and the like. The controller may retrieve battery state inputs, such as the present state of charge, present temperature, and the like. The charging and conditioning may be further tailored using weather information such as predicted temperatures from a forecast. Information regarding external power cost rates and loads may also be retrieved to further tailor the charging process. An algorithm uses the user input and other informational inputs to create a charging profile for the vehicle that includes a target state of charge for the battery, a target battery temperature, and a target cabin temperature for when the vehicle is scheduled to be taken off charge. By charging and conditioning the vehicle according to the charging profile, the vehicle is prepared to a state of charge requested by the user while costs are minimized. The cabin is prepared to a temperature requested by the user. The battery temperature is conditioned to a temperature that allows for the battery to be charged to the target state of charge, and to later account for the thermal loads on the battery caused by a high or low ambient temperature while the vehicle is operating. Conditioning the battery temperature may increase energy efficiency for the vehicle while driving as less battery energy is directed towards thermal management of the battery and more may be used to propel the vehicle.

DETAILED DESCRIPTION

As required, detailed embodiments of the present disclosure are disclosed herein; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
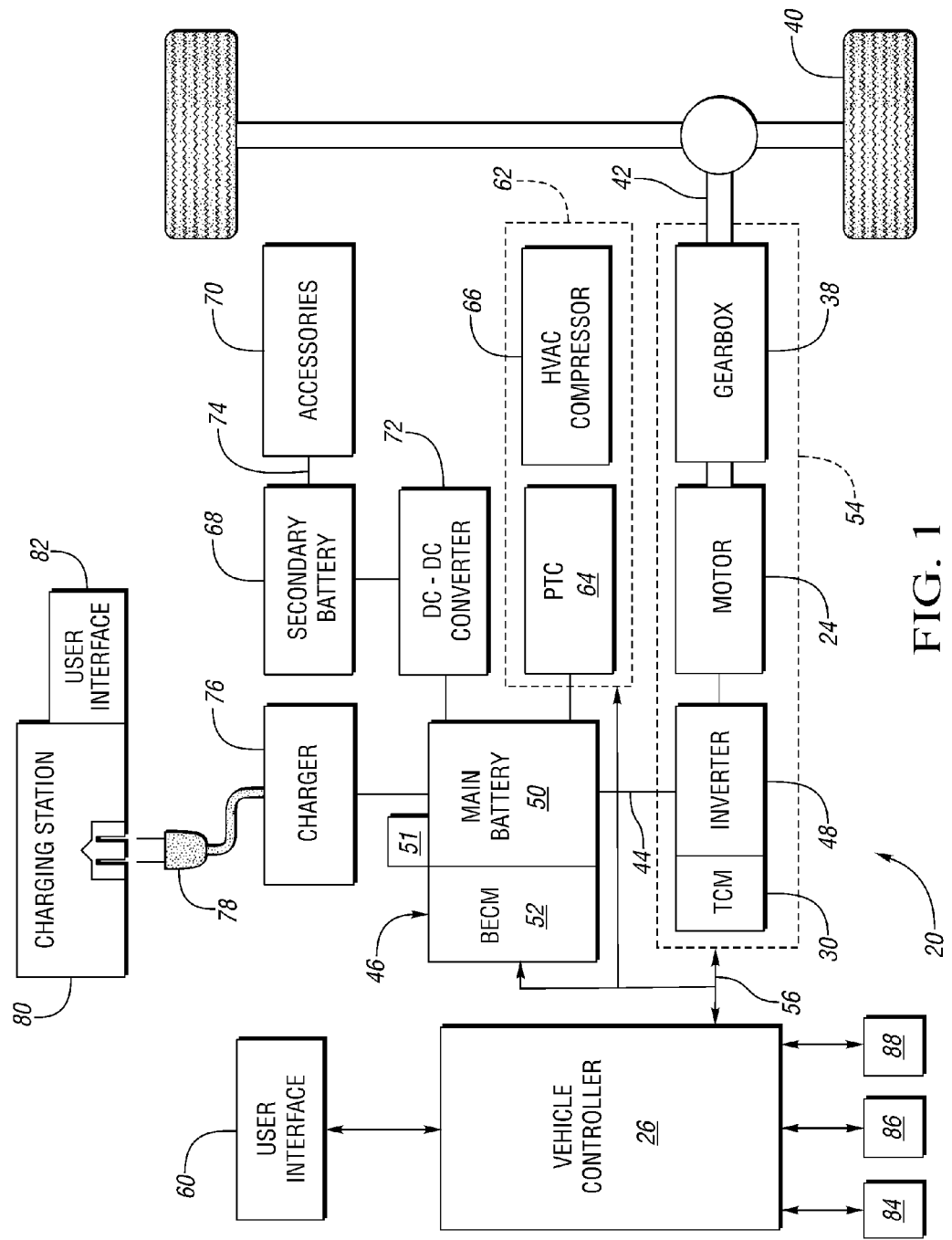
FIG. 1 is a schematic of a battery electric vehicle according to an embodiment.

With reference to FIG. 1, an electric vehicle 20, such as a battery electric vehicle (BEV), is illustrated in accordance with one or more embodiments. FIG. 1 represents only one type of BEV architecture, and is not intended to be limiting. The present disclosure may be applied to any suitable BEV. Additionally, in other embodiments, the present disclosure may be applied to other vehicle architectures, such as a plug-in hybrid vehicle (PHEV).

The vehicle 20, or BEV, is an all-electric vehicle propelled through electric power, such as by an electric motor 24, and without assistance from an internal combustion engine. The motor 24 receives electrical power and provides mechanical rotational output power. The motor 24 is connected to a gearbox 38 for adjusting the output torque and speed of the motor 24 by a predetermined gear ratio. The gearbox 38 is connected to a set of drive wheels 40 by an output shaft 42. Other embodiments of the vehicle 20 include multiple motors (not shown) for propelling the vehicle 20. The motor 24 may also function as a generator for converting mechanical power into electrical power. A high voltage bus 44 electrically connects the motor 24 to an energy storage system 46 through an inverter 48.

The energy storage system 46 includes a main battery 50 and a battery energy control module (BECM) 52, according to one or more embodiments. The main battery 50 is a high voltage battery, or traction battery, that may output electrical power to operate the motor 24. The main battery 50 is a battery pack made up of one or more battery modules (not shown). Each battery module may contain one battery cell or a plurality of battery cells. The battery cells are heated and cooled using a fluid coolant system, air coolant system, or other coolant method as is known in the art. The BECM 52 acts as a controller for the main battery 50. The BECM 52 also includes an electronic monitoring system that manages temperature and state of charge of each of the battery cells. The battery 50 has at least one temperature sensor 51, such as a thermistor or the like. The sensor 51 is in communication with the BECM 52 to provide temperature data regarding the battery 50.

The motor 24, the transmission control module (TCM) 30, the gearbox 38, and the inverter 48 are collectively referred to as a transmission 54. The vehicle controller 26 communicates with the transmission 54, for coordinating the function of the transmission 54 with other vehicle systems. The controller 26, BECM 52, and TCM 30 are illustrated as separate controller modules. The control system for the vehicle 20 may include any number of controllers, and may be integrated into a single controller, or have various modules. Some or all of the controllers may be connected by a controller area network (CAN) or other system. The control system may be configured to control operation of the various components of the transmission 54 and the battery 50 under any of a number of different conditions, including in a way that thermally manages the temperature in the battery 50 and the vehicle cabin or passenger compartment, and for charging and discharging operations of the battery 50.

The TCM 30 is configured to control specific components within the transmission 54, such as the motor 24 and/or the inverter 48. The vehicle controller 26 monitors the temperature of the motor 24 and receives a throttle request (or desired motor torque request) from the driver. Using this information the vehicle controller 26 provides a motor torque request to the TCM 30. The TCM 30 and the inverter 48 convert the direct current (DC) voltage supply by the main battery 50 into signals that are used to control the motor 24 in response to the motor torque request.

The vehicle controller 26 provides information to the driver through a user interface 60. The user interface 60 may include features that permit a user to enter requirements or desired operating or charging parameters of the vehicle, or other vehicle operating parameters into the controller 26. The user interface 60 may include a touch screen interface, a wireless connection to a remote station, such as a mobile device or computer, and other input interfaces as are known in the art.

The vehicle controller 26 also receives input signals that are indicative of current operating conditions of vehicle systems. For instance, the vehicle controller 26 may receive input signals from the BECM 52 that represent battery 50 conditions, and input signals from the transmission 54, that represent motor 24 and inverter 48 conditions. The vehicle controller 26 provides output to the user interface 60, such as a motor status or charge level status, which may be conveyed visually to the driver.

For example, the user may input a departure time, desired cabin temperature at departure time, or the like, using the user interface 60, or to another interface in communication with charger 76, or charging station 80. Alternatively, the controller 26 may include a probabilistic or other logic module that determines a user's driving habits, including trip lengths, trip paths, departure times, cabin climate preferences, etc. The controller 26 may be configured to arbitrate between the various user requests or predicted vehicle operating conditions to thermally manage the vehicle 20 while on-charge.

The vehicle 20 includes a climate control system 62 for heating and cooling various vehicle components. The climate control system 62 includes a high voltage positive temperature coefficient (PTC) electric heater 64 and a high voltage electric HVAC compressor 66, according to one or more embodiments. The PTC 64 and HVAC compressor 66 are used to heat and cool fluid, respectively, that circulates to the main battery 50 and the vehicle cabin heating, air conditioning, and ventilation (HVAC) system. Both the PTC 64 and the HVAC compressor 66 may draw electrical energy directly from the main battery 50. The climate control system 62 may include a controller (not shown) for communicating with the vehicle controller 26 over the CAN bus 56 or may be integrated into the controller 26. The on/off status of the climate control system 62 is communicated to the vehicle controller 26, and can be based on, for example, the status of an operator actuated switch, or the automatic control of the climate control system 62 based on related functions, such as window defrost. The climate control system 62 may be connected to the user interface 60 to permit a user to set a temperature for the cabin, or pre-program a desired cabin temperature for a future operating cycle of the vehicle.

The vehicle 20 includes a secondary battery 68, such as a 12-volt battery, according to one embodiment. The secondary battery 68 may be used to power various vehicle accessories such as headlights and the like, which are collectively referred to herein as accessories 70. A DC-to-DC converter 72 may be electrically disposed between the main battery 50 and the secondary battery 68. The DC-to-DC converter 72 adjusts, or "steps down" the voltage level to allow the main battery 50 to charge the secondary battery 68. A low voltage bus 74 electrically connects the DC-to-DC converter 72 to the secondary battery 68 and the accessories 70.

The vehicle 20 includes an AC charger 76 for charging the main battery 50. An electrical connector 78 connects the AC charger 76 to an external power supply 80 for receiving AC power. The AC charger 76 includes power electronics used to convert, or "rectify" the AC power received from the external power supply to DC power for charging the main battery 50. The AC charger 76 is configured to accommodate one or more conventional voltage sources from the external power supply 80 (e.g., 110 volt, 220 volt, two phase, three phase, level 1, level 2, etc.) In one or more embodiments, the external power supply 80 includes a device that harnesses renewable energy, such as a photovoltaic (PV) solar panel, or a wind turbine (not shown).

The external power supply 80 may include a user interface 82. The user interface 82 may include features that permit a user to enter charging requirements or desired charging parameters for the vehicle. The user interface 82 may include a touch screen interface, a wireless connection to a remote station, such as a mobile device, computer, or an internet server, and other input interfaces as are known in the art. The user interface 82 may include a controller that communicates with the vehicle controller 26 to determine any charging and trip parameters for the vehicle that are input from user interface 60. The charging station 80 may also receives input signals that are indicative of current operating conditions of vehicle systems. For instance, the charging station 80 may receive input signals from the BECM 52 that represent existing battery 50 conditions. The vehicle controller 26 or charging station 80 may provide output to the user interface 82, such as a charge level status or HVAC setting. The user interface 82 may be configured to receive an input from the user regarding a state of the vehicle for when it is to be taken off-plug.

Also shown in FIG. 1 are simplified schematic representations of a driver controls system 84, a power steering system 86, and a navigation system 88. The driver controls system 84 includes braking, acceleration and gear selection (shifting) systems. The braking system includes a brake pedal, position sensors, pressure sensors, or some combination thereof, as well as a mechanical connection to the vehicle wheels, such as the primary drive wheels 40, to effect friction braking The braking system may also be configured for regenerative braking, wherein braking energy may be captured and stored as electrical energy in the main battery 50. The acceleration system includes an accelerator pedal having one or more sensors, which, like the sensors in the braking system, provides information such as the throttle request to the vehicle controller 26. The gear selection system includes a shifter for manually selecting a gear setting of the gearbox 38. The gear selection system may include a shift position sensor for providing shifter selection information (e.g., PRNDL) to the vehicle controller 26.

The navigation system 88 may include a navigation display, a global positioning system (GPS) unit, a navigation controller and inputs (all not shown) for receiving destination information or other data from a driver. The navigation system may be integrated with the user interface 60 in some embodiments. The navigation system 88 may also communicate distance and/or location information associated with the vehicle 20, its target destinations, or other relevant GPS waypoints.

Figure 2:
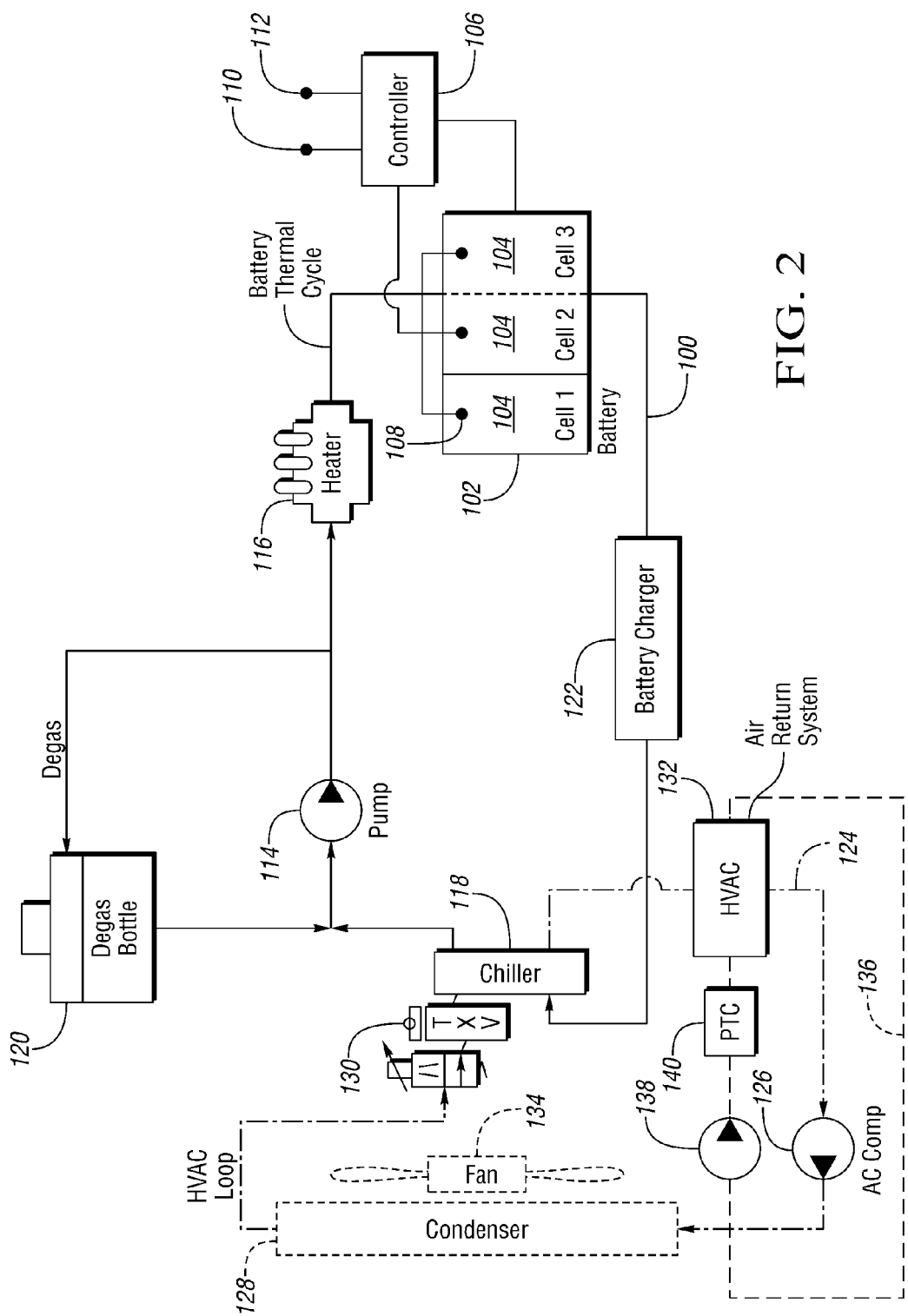
FIG. 2 is a schematic of a battery thermal management system according to an embodiment.

FIG. 2 illustrates a thermal system for use with vehicle 20 as shown in FIG. 1. Of course, other thermal systems as are known in the art may be used with vehicle 20 or various embodiment of the disclosure. The battery thermal circuit 100 may heat and cool the traction battery 102. Battery 102 is the main battery 50 in vehicle 20. The traction battery 102 is made up of one or more battery packs, and a battery 102 having one pack is shown in FIG. 2. Each battery pack may have multiple cells. The battery 102 in FIG. 2 has three cells 104, although any number of cells may be used with a battery 102 as is known in the art.

The controller 106, which may be a vehicle controller in communication with or integrated with the battery control module 52, monitors the battery 104 to determine the state of charge and capacity of the battery 102. Each cell 104 may have an associated temperature sensor 108 that is configured to measure the cell temperature. The temperature sensor 108 is in communication with the controller 106 such that the controller 106 also monitors the battery 102 temperature by monitoring each cell temperature. The controller 106 determines the temperature of the battery 102 by measuring or estimating the temperatures of the various battery cells 104.

The controller 106 is also in communication with an ambient temperature sensor 110 on the vehicle. The ambient temperature sensor 110 is configured to measure the temperature of the ambient environment, i.e. outside air. A cabin temperature sensor 112 is also in communication with the controller 106 and measures the temperature of the vehicle 20 passenger cabin to provide feedback for the HVAC system for climate control of the cabin.

The battery 102 may have its temperature actively regulated using the thermal circuit 100 controlled by controller 106. The temperature of the battery 102 and of each cell 104 determines the amount of charge that the battery 102 may accept and the amount of charge available for use and stored in the battery.

The thermal circuit 100 thermally manages the battery 102 to regulate cell 104 temperatures to maintain the battery 102 useful life, permit a proper charge, and meet vehicle performance attributes. The thermal circuit 100 provides active heating or active cooling via liquid heat transfer with the battery 102. The battery thermal circuit 100 may be integrated into a vehicle thermal system having both climate control heating and cooling elements and powertrain cooling elements.

The thermal circuit 100 contains a fluid that cycles through cooling channels adjacent to the cells 104 in the battery to heat or cool the battery 102 using conductive and convective heat transfer. A pump 114 controls the flow of the fluid in the circuit 100. A heating element 116 acts as a thermal source for the fluid to heat the fluid and in turn to actively heat the battery 102. The heating element may be a heat exchanger with another thermal system in the vehicle to recover waste heat, or may be a stand-alone heater, such as an electrically powered heater including a positive temperature coefficient (PTC) heater. The heating element 116 may be heater 64 as shown in FIG. 1.

The battery thermal circuit 100 also has a chiller element 118, or thermal sink, that cools the fluid which in turn may actively cool the battery 102. The chiller may be part of a vapor compression or absorption cycle, a heat exchanger with another element in the vehicle thermal systems, or other thermal sink as is known in the art. Heat exchangers in the system may be co-flow, counterflow or other heat exchangers as are known in the art to appropriately heat or cool the fluid in the circuit 100.

The circuit 100 has a degas bottle 120 to remove air from the fluid in the vehicle thermal circuit including circuit 100 and other vehicle thermal systems and increase the thermal efficiency of the circuit 100. The degas bottle 120 may be an air trap, separator, or other device as is known in the art. The degas bottle 120 may also act as a fill location to add additional fluid to the circuit 100 as needed, such as during a service event.

The battery thermal circuit 100 may also flow through the battery charger 122 to actively heat or cool the charger 122 and charging components. Battery charger 122 is charger 76 in vehicle 20 as shown in FIG. 1.

The air conditioning circuit 124 of the HVAC system for the vehicle, or climate control system for the vehicle passenger cabin, is illustrated as having a common chiller 118 with the battery circuit 100. Of course, the air conditioning circuit 124 may be separate from the battery circuit 100, be integrated further with the battery circuit 100, or have other system architectures. The air conditioning circuit 124 has a fluid loop with a compressor 126, a condenser 128, a throttle 130, and the chiller 118 to provide cooled fluid to the HVAC air return system 132 to provide cool air to the cabin vents. Air flows over the condenser 128 from a fan 134. The compressor 126 may be compressor 66 as shown in FIG. 1.

A heating system 136 is also provided for the cabin HVAC system 132. A heating circuit 136 may be integrated with the air conditioning circuit 124, the battery thermal circuit 100, or be a separate system. The heating circuit 136 may be a fluid system. In one embodiment, the heating circuit 136 has a heating element 140 that heats the fluid in the circuit 136 to then provide warm fluid to the HVAC system heat exchanger 132, which in turn heats air for the cabin. The heating system may have a return loop to reheat cabin air, and may also have a fresh air intake to add additional outside air to the cabin. In one embodiment, the heating element 140 is a PTC heater, and may be heater 64 as shown in FIG. 1.

Figure 3:
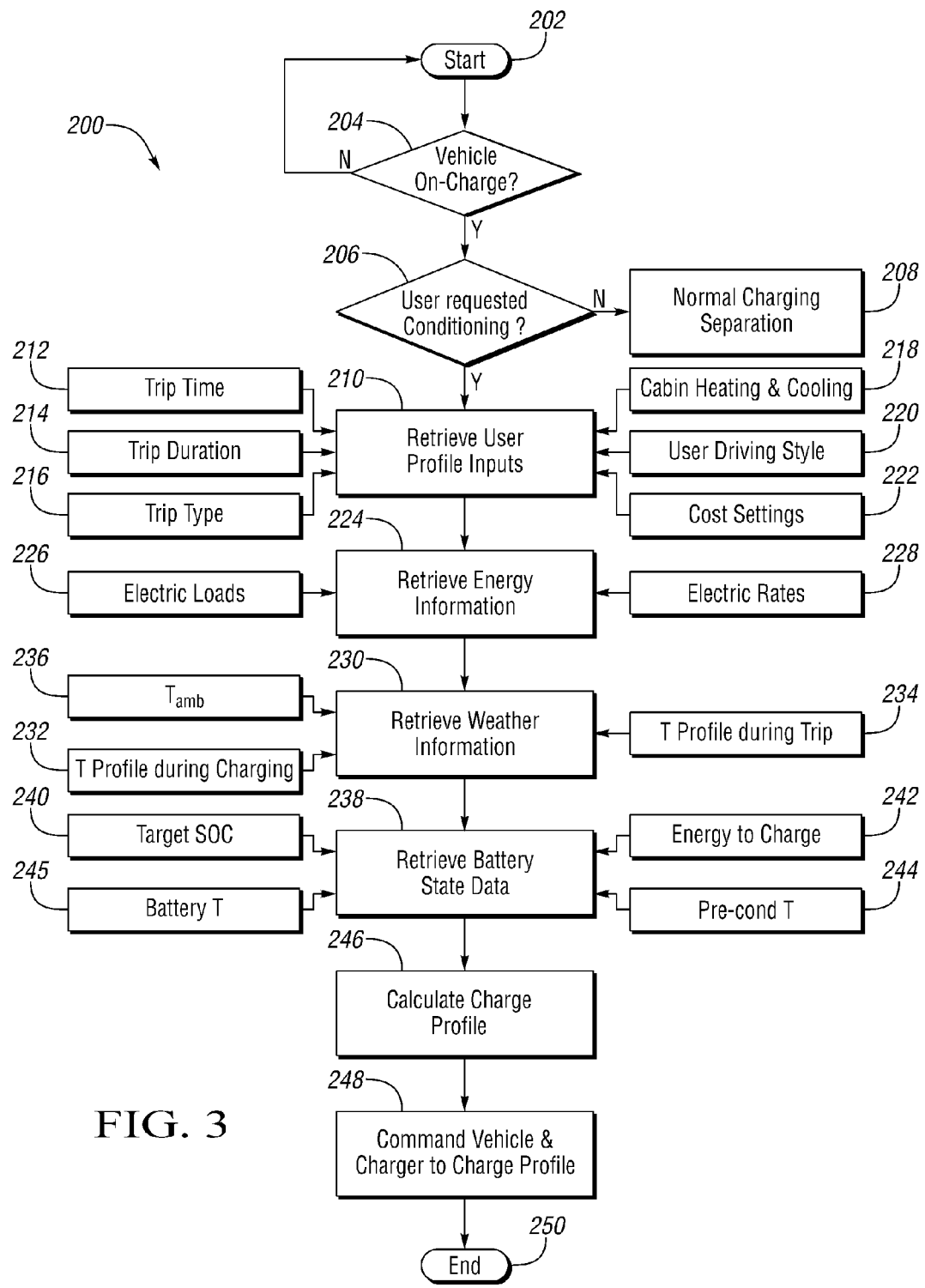
FIG. 3 is a flow chart illustrating an overall control algorithm for the thermal management of the battery.

FIG. 3 illustrates a flow chart for controlling the battery and cabin temperatures of the vehicle 20 while the vehicle 20 is on-charge. When the vehicle 20 is charging, it is connected to the charging station 80 and may be receiving power therefrom. The battery 50 has a charging temperature range as well as an operating temperature range. Generally, low temperature thresholds for the battery 50 are in the range of ten degrees Celsius to minus forty degrees Celsius. The high temperature thresholds for the battery 50 are in the range of thirty degrees Celsius to sixty degrees Celsius.

Within an operating temperature range, the battery 50 is not thermally managed by circuit 100. The operating temperature range for the battery 50 has a lower threshold at which the battery 50 operates without active heating provided from the thermal circuit 100, or passive heating from the battery 50 itself. The operating temperature range for the battery 50 also has an upper threshold at which the battery operates without cooling provided from the thermal circuit 100.

Within a charging temperature range, the battery 50 may be charged to full capacity. The charging temperature range for the battery 50 has a lower target temperature or threshold at which a full charge of the battery in a cold ambient temperature may be obtained with normal operating performance delivered to the vehicle. The charging temperature range for the battery 50 has an upper target temperature or threshold at which a full charge of the battery in a hot ambient temperature may be obtained with normal operating performance delivered to the vehicle.

When the vehicle is operating and the battery temperature is outside the operative temperature range, vehicle performance may be reduced due to battery 50 chemistry changing. In some circumstances, the controller 26 may need to de-rate the power available to the motor to propel the vehicle either linearly or non-linearly, and operate in a reduced power setting when the battery 50 temperature is outside the operating temperature range and the vehicle is operating. The controller may provide a user notice through the user interface 60 to inform the user of the limited available power state. In additional circumstances, at further temperature extremes, the propulsion system may not have sufficient power to meet the limited performance thresholds discussed above, and the battery 50 power may not be able to provide sufficient power to both propel the vehicle and operate the climate control system.

The ambient temperature may be measured to provide an environmental temperature range. For example, when the vehicle 20 is connected to the charger 80, the controller 26 may condition the battery 50 or the cabin in preparation for vehicle operation in conditions outside the environmental range or to control the battery temperature when charging in conditions outside the environmental range.

When the vehicle 20 is connected to the battery charger 80 for outside power to charge the battery, the controller 26 may prioritize heating or cooling the battery to within the charging temperature range limits before beginning a charge cycle to protect the battery before charging. The thermal circuit will heat or cool the battery as necessary before initiating a charging cycle. The controller may also condition the cabin temperature in anticipation of vehicle use or as directed by the user.

Regulating the battery 50 temperature while the vehicle is connected to a charger 80 may serve to protect the battery and preserve the battery life, permit the battery to accept a full available charge to a maximum state of charge, and provide a high level of vehicle performance when the vehicle is operated after disconnecting from the charger and power source.

While the vehicle is connected to the charger 80, the battery may be conditioned to a warm temperature threshold when there is a cold ambient temperature (or likewise to a cold temperature threshold when there is a warm ambient temperature) to increase vehicle performance and range. For example, when the battery 50 is conditioned to a warm temperature near the upper limit of its operating range, it will take longer for the battery to cool below the low operating temperature limit if the vehicle is later parked at a destination in a cold ambient temperature environment.

When the ambient temperature is outside the environmental temperature range, there is a high likelihood that the battery 50 will need to be heated or cooled based on the additional thermal effect on the battery temperature from the environment. If the battery is not conditioned during charging, energy from the battery may need to be used to cool or heat the battery when the vehicle operates. By conditioning the battery, energy used for heating or cooling the battery for the start of the trip comes from the charger 80, and less energy is then required from the battery 50 itself to thermally regulated the battery temperature while the vehicle is driving.

For example, on a warm day, when the ambient temperature is above the upper threshold of the environmental temperature range, the controller will command the thermal circuit 100 to cool the battery 50 while the vehicle 20 is on-charge to a predetermined temperature, which may be approximately at or near the low operating temperature threshold of the battery. On a cool day, when the ambient temperature is below the lower threshold temperature of the environmental temperature range, the controller will command the thermal circuit 100 to heat the battery 50 while the vehicle is on-charge to a predetermined temperature, which may be approximately at or near the high temperature operating threshold of the battery. This process may be referred to as conditioning or pre-conditioning the battery. In some embodiments, the battery may be slightly heated or cooled during the on-charge conditioning process to outside its normal operating temperature range in anticipation of the thermal effect of the environment on the battery once the vehicle begins to operate.

Regulating the battery temperature while the vehicle is on-charge permits both a larger amount of energy to be stored in the battery due to the battery chemistry. Conditioning the battery to a specified temperature while the vehicle is charging causes a higher energy efficiency for the vehicle later during operation as less battery energy may be needed to thermally manage the battery and more may be directed to propulsion, thereby extending the vehicle range. Conditioning the cabin to a specified temperature while the vehicle is charging also causes a higher energy efficiency for the vehicle later during operation as less battery energy may be needed to heat or cool the cabin and more may be directed to vehicle propulsion, also extending the vehicle range as well as providing improved comfort levels for a user.

Therefore, conditioning the battery and the cabin using outside power provided by the charger offsets battery power that may be required later to heat or cool the battery or the cabin when the vehicle is operating and available energy is limited to that contained in the battery. The controller arbitrates the various functions based on input charge available, the state of the battery, an ambient temperature, a known departure time, other user inputs, and various additional factors.

An overall control algorithm 200 for thermal management of the vehicle 20 is shown in FIG. 3. The controller 26 initiates the algorithm at 202. At 204, the controller 26 determines if the vehicle 20 is connected to a charger and power source 80, for example, after a vehicle shut down event. The algorithm 200 then determines if the user has requested pre-conditioning or conditioning at 206 for when the vehicle is on-charge. A conditioning request may include a user initiated request for conditioning such as the user inputting a request regarding battery charging, battery conditioning, and cabin conditioning. This request 206 may be made through user interface 60, user interface 82, in a stored user profile in the controller 26, at a remote location interface, or the like. The conditioning request 206 and user profile may be stored in controller accessible memory for repeated use. Alternatively, the conditioning request may be a one-time request at the time of vehicle shut down or when the vehicle 20 is connected to the charger 80. The vehicle 20 may have more than one user profile stored in the controller 26 memory as presets. Additionally, each user profile may have several charging and preconditioning profiles stored for ease of selection by the user. For example, the controller 26 may detect a location of the vehicle and choose a charging profile within a user profile that is location based, e.g. a home profile, a work profile, etc.

If the user has not requested conditioning at 206, the algorithm 200 proceeds to 208. At 208, the controller 26 and charger 80 charge the battery 50 under normal or typical charging operation for the vehicle 20. If the user has requested conditioning, the algorithm 200 proceeds to 210 where it retrieves any charging and conditioning inputs from the user.

The algorithm 200 may access the user profile at 210 to retrieve inputs from the user at the present charging cycle or based on inputs from a previous time. The user may input charging and conditioning parameters using one of the user interfaces 60, 82, or another input system. The user interfaces 60, 82 may include various prompts or inputs for the user to select charging and conditioning options for the vehicle 20. These may be selected via a touch screen or other input on the user interface 60, 82, by creating a network based profile for access by the vehicle 20 or charging station 80, or the like. In one embodiment, the user may remotely select inputs for a user profile using a personal computer, a mobile device, and the like. The algorithm 200 may include a series of screens via the user interface 60, 82 to prompt user selection of the various user control inputs for the algorithm 200.

For example, the controller 26 may receive a user profile input at 210 regarding the expected departure time for the next trip 212 in order to determine the length of time that the vehicle will be connected to the charging station 80. The controller may also receive a user profile input at 210 regarding the expected time duration of the next trip 214 or trip length that may provide information about the amount of charge to complete the next trip. The controller 26 may receive a user profile input at 210 regarding the type of trip at 216. The type of trip at 216 may be categorized and include a quick trip, an errands trip, a work trip, and the like. These various trip types at 216 may have generalized or estimated predicted durations associated with them, and may also include predictive vehicle 20 operation information, such as multiple, short driving cycles for an errand trip and two driving cycles of a set duration or length for a to and from work trip. The trip type at 216 may also include categories such as a city driving cycle, a highway driving cycle, and the like.

The controller 26 may also receive a user profile input at 210 for cabin conditioning 218 such that the vehicle passenger cabin temperature is at a desired user temperature or within a desired temperature range when the vehicle 20 is scheduled to be taken off the charger 80 and operated. By conditioning the cabin while on-charge, less battery energy is consumed on the trip for cabin HVAC purposes. For example, on a day with a high ambient temperature, the cabin temperature may reach ninety degrees. By preconditioning the cabin while the vehicle 20 is on charge, for example to seventy degrees, battery energy is only be used to generally maintain the cabin temperature when the vehicle is operating. If the vehicle cabin is not conditioned, battery power may be used to cool the cabin from ninety to seventy degrees while the vehicle is operating, thereby reducing the battery energy available to propel the vehicle. At 218, the user may provide an input to cool the cabin to a predetermined temperature or temperature range, or alternatively, may provide an input to heat the cabin to a predetermined temperature or temperature range.

The controller 26 may also receive a user profile input at 220 regarding the driving style of the user. For example, the user may select a driving style such as aggressive with an associated lower fuel economy in general, or sustainable with a high conservation of energy and an associated increased fuel economy.

The controller 26 may receive a user profile input at 210 regarding cost settings at 222 such as whether to charge now, charge as needed, or to minimize cost of charging. For example, if the user selects charge now at 222, the charger 80 may charge the battery 50 at the highest practical or permissible charging rate for the battery 50 for the time that that vehicle 20 is on-charge up to a full battery 50 charge in order to maximize the energy stored in the battery, regardless of cost. If the user selects minimize cost at 222 and the cost of electricity is low on a per kilowatt hour basis, the charger 80 may charge the battery 50 at the highest practical or permissible charging rate for the battery 50 for the time that vehicle 20 is on-charge up to a fully battery 50 charge in order to maximize the energy stored in the battery at a low cost. If the user selects minimize cost at 222 and the cost of electricity is high on a per kilowatt hour basis, the charger 80 may charge the battery 50 only to the amount needed to meet the vehicle energy demand for the next trip or driving cycle in order to reduce or minimize charging costs for the user. If the cost of electricity is in a middle price range on a per kilowatt hour basis, the controller 26 may arbitrate to determine the cost to charge value for the user while charging the battery 50 to at least the amount of charge needed for the next trip or driving cycle.

The algorithm 200 proceeds from retrieving the user profile or user inputs at 210 to retrieving energy data at 224. In one embodiment, the controller 26 of the vehicle 20 or the charging station 80 may communicate with an external energy supplier, or other party, to retrieve or synchronize the energy information. The controller 26 may retrieve information regarding electric load schedules at 226 for various levels of the grid over time, i.e. at a transformer station, at a service location, etc. The controller 26 may retrieve information regarding electric rates at 228 over time, i.e. the cost per kilowatt-hour at various times and days. This energy information 224 allows for a determination of when the cost for charging and the load on the outside power system, i.e. electrical grid, will be high or low.

The algorithm 200 then proceeds to 230 and retrieves weather data. The controller 26 for the vehicle 20 or the controller for the charging station 80 may communicate with a weather service, weather station, or other outside service to retrieve or synchronize weather information. The controller may retrieve a charging ambient temperature profile that predicts the ambient outside temperature during the time that the vehicle 20 is to be connected to the charging station at 232. The controller may retrieve an operating ambient temperature profile that predicts the ambient outside temperature over the time that the vehicle is to be operating on the next scheduled trip or driving cycles at 234. The controller may also determine the present ambient outside temperature at 236, either from the weather service or using a temperature sensor located on the vehicle 20 or on the charging station 80.

The algorithm 200 then retrieves information regarding the battery 50 state at 238, for example, from the BECM 52. Various battery states may be retrieved, including: a target SOC for the battery 50 at 240, the energy needed to charge the battery 50 based on the present SOC at 242, a conditioning temperature for the battery 50 at 244, and the present temperature of the battery 50 at 245. The temperature of the battery 50 is measured using temperature sensors 108 in the various battery cells 104 at 245, or alternatively, the temperature of the battery 50 may be estimated. The controller 26 may average the temperature measurements of all of the cells 104 to obtain an average battery temperature. Alternatively, the controller 26 may use the most limiting cell 104 temperature when the ambient temperature as measured by the controller 26 is outside an environmental temperature range. For example, if the ambient temperature is below the environmental temperature range, the controller 26 may use the temperature of the coldest cell 104 in the battery 50 as the overall battery 50 temperature. Conversely, if the ambient temperature is above the environmental temperature range, the controller 26 may use the temperature of the warmest cell 104 in the battery 50 as the overall battery 50 temperature.

The conditioning temperature at 244 is the temperature to which the battery 50 may be thermally controlled to increase the available energy capacity of the battery while charging and/or to pre-heat or pre-cool the battery in preparation for the next trip. By conditioning the battery 50 while on charge, less battery energy is later consumed on the trip for regulating the battery 50 temperature to within its operating temperature range.

The algorithm 200 then determines a charging profile at 246 by arbitrating the user profile information at 210, energy information at 224, weather information at 230, and battery state information at 238. The charging profile at 246 contains information used to control the charging process in terms of how and when to charge the battery 50, how and when to condition the battery 50 temperature, and/or how and when to condition the cabin temperature. The controller 26 determines the time to start charging the battery and to start conditioning the battery and/or cabin in order to reach the desired temperature compensated state of charge, the target battery conditioning temperature, and the target cabin conditioning temperature. The time to start charging may additionally be based on minimizing electrical costs to charge the vehicle. The desired SOC may be any target value up to and including a complete charge for the battery.

The algorithm 200 then proceeds to 248 where the controller 26 executes the charging profile to charge the battery, condition the battery, and/or condition the cabin as determined at 246. The controller 26 executes the charging profile until the vehicle is taken off-charge at the scheduled or determined time. The algorithm 200 then ends at 250.

If the vehicle 20 remains on-charge for a longer time than initially scheduled or estimated, the controller 26 may hold the battery temperature and/or the cabin temperature for a period of time to maintain the respective temperatures in anticipation of vehicle 20 use. The controller 26 may end executing the charging profile if the vehicle 20 is not taken off-charge within a predetermined period of time following the scheduled trip time to conserve energy, or alternatively, may send a message to the user requesting authorization for this action. If the vehicle 20 is taken off-charge at an earlier time than is scheduled or estimated, the user will receive the vehicle 20 at whatever battery charge level, battery temperature, and cabin temperature exists at that time.

The user may modify the user profile at 210 at any point during a charge cycle. If the user does modify the user profile at 210, for example, with a different scheduled departure time, cabin temperature requirement, trip type or the like, the algorithm 200 will return to the user requesting preconditioning at 206 and recalculate a charge profile as described above in order to meet the new user request. Additionally, in some embodiments, the charge profile may be recalculated and adjusted during a charging cycle due to a significant weather change, or other change in charging profile inputs. If the user cancels the requested preconditioning during the charge cycle, the algorithm 200 returns to 206 and then proceeds to 208 with standard charging operation.

Various embodiments have associated, non-limiting advantages. For example, while the vehicle is connected to an external power source, or charger, the user may have input on how the electric vehicle is charged and/or conditioned for use, which includes both battery conditioning and cabin conditioning. Various user inputs may include a departure time, trip information, desired cabin temperature, driving styles, user selected cost to charge, and the like. The controller may retrieve battery state inputs, such as the present state of charge, present temperature, and the like. The charging and conditioning may be further tailored using weather information such as predicated temperatures from a forecast. Information regarding external power cost rates and loads may also be retrieved to further tailor the charging process. An algorithm uses the user input and other informational inputs to create a charging profile for the vehicle that includes a target state of charge for the battery, a target battery temperature, and a target cabin temperature for when the vehicle is scheduled to be taken off charge. By charging and conditioning the vehicle according to the charging profile, the vehicle is prepared to a state of charge requested by the user while costs are minimized. The cabin is prepared to a temperature requested by the user. The battery temperature is conditioned to a temperature that allows for the battery to be charged to the target state of charge, and to later account for the thermal loads on the battery caused by a high or low ambient temperature while the vehicle is operating. Conditioning the battery temperature may increase energy efficiency for the vehicle while driving as less battery energy is directed towards thermal management of the battery and more may be used to propel the vehicle.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments that are not explicitly illustrated or described. Where one or more embodiments have been described as providing advantages or being preferred over other embodiments and/or over prior art with respect to one or more desired characteristics, one of ordinary skill in the art will recognize that compromises may be made among various features to achieve desired system attributes, which may depend on the specific application or implementation. These attributes include, but are not limited to: cost, strength, durability, life cycle cost, marketability, appearance, packaging, size, serviceability, weight, manufacturability, ease of assembly, etc. As such, any embodiments described as being less desirable relative to other embodiments with respect to one or more characteristics are not outside the scope of the claimed subject matter.

What is claimed is:

1. An electric vehicle comprising:
   a traction battery having a battery temperature sensor;
   a cabin climate control system having a cabin temperature sensor;
   a thermal circuit connected to the traction battery and the cabin climate system, the thermal circuit having a thermal source and a thermal sink;
   a user interface; and
   a controller connected to the traction battery, the battery temperature sensor and the cabin temperature sensor, the thermal circuit, and the user interface, the controller configured to, in response to receiving a user input requesting vehicle conditioning from the user interface and receiving a predictive ambient temperature profile, and the traction battery being connected to an external power source, (i) charge the traction battery to a target state of charge provided by a charging profile based on the user input, (ii) condition the traction battery to a target battery temperature provided by the charging profile, and (iii) condition a cabin in the vehicle to a target cabin temperature provided by the charging profile, wherein the charging profile provides at least one scheduled time to begin charging the battery, conditioning the battery, and conditioning the cabin, and wherein the target battery temperature and target cabin temperature of the charging profile are further based on the predictive ambient temperature profile.

2. The electric vehicle of claim 1 wherein the controller is further configured to receive external power rates;
   wherein the user input includes a selected cost of charging; and
   wherein the charging profile is further based on the external power rates.

3. The electric vehicle of claim 1 wherein the thermal source of the thermal circuit is an electric heater.

4. The electric vehicle of claim 1 wherein the predictive ambient temperature profile represents the ambient temperature profile while the vehicle is predicted to be connected to the external power source and the ambient temperature profile while the vehicle is predicted to be operating.

5. The electric vehicle of claim 1 wherein the controller is configured to hold the battery at the target state of charge, hold the battery at the target battery temperature, and hold the cabin at the target cabin temperature for a predetermined time period when the vehicle remains connected to the external power source after a user selected time for the vehicle to be disconnected from the external power source.

6. A method for controlling an electric vehicle while connected to an external power source, the method comprising, charging a traction battery to a target state of charge, conditioning the battery to a target battery temperature, and conditioning a cabin to a target cabin temperature according to a charging profile based on a user initiated request for vehicle conditioning and a predictive ambient temperature profile.

7. The method of claim 6 wherein the charging profile provides at least one scheduled time to begin charging the battery, conditioning the battery, and conditioning the cabin.

8. The method of claim 6 further comprising receiving the predictive ambient temperature profile;
   wherein the target battery temperature and target cabin temperature of the charging profile are further based on the predictive ambient temperature profile.

9. The method of claim 6 wherein the predictive ambient temperature profile represents the ambient temperature profile while the vehicle is predicted to be connected to the external power source.

10. The method of claim 6 wherein the predictive ambient temperature profile represents the ambient temperature profile while the vehicle is predicted to be operating.

11. The method of claim 6 further comprising receiving external power rates;
    wherein the target state of charge of the charging profile is further based on the external power rates.

12. The method of claim 11 wherein the charging profile includes a schedule of when to begin charging the battery and when to begin conditioning the battery based on cost of charging.

13. The method of claim 6 further comprising retrieving battery state data from a battery control module;
    wherein the battery state of charge and battery temperature target of the charging profile are further based on the battery state data.

14. The method of claim 13 wherein the battery state data includes a present battery state of charge and the target battery state of charge.

15. The method of claim 6 wherein the user initiated request includes a user selected time for the vehicle to be disconnected from the external power source.

16. The method of claim 15 further comprising conditioning a cabin to a target cabin temperature according to the charging profile based on the user initiated request for vehicle conditioning; and
    holding the battery at the target state of charge, holding the battery at the target battery temperature, and holding the cabin at the target cabin temperature for a predetermined time period when the vehicle remains connected to the external power source after the user selected time.

17. The method of claim 6 wherein the user initiated request includes a desired cabin temperature.

18. The method of claim 6 wherein the user initiated request includes a desired cost for charging.

19. The method of claim 6 wherein the user initiated request includes a driving style.

20. A method of controlling a vehicle having a traction battery, comprising:
    detecting if the traction battery is connected to a charger and external power source;
    receiving a user initiated request for vehicle conditioning while the traction battery is connected to the charger and external power source;
    charging the traction battery to a target state of charge while the traction battery is connected to the charger and external power source;
    conditioning a temperature of the traction battery to a target battery temperature while the traction battery is connected to the charger and external power source and ambient temperature is outside an environmental temperature range; and
    conditioning a cabin in the vehicle to a target cabin temperature while the vehicle is connected to the charger and external power source;

wherein the target battery state of charge, the target battery temperature, and the target cabin temperature are determined from a charging profile based on the user initiated request and a predicted ambient temperature profile.

* * * * *